(12) United States Patent
Fukushima et al.

(10) Patent No.: US 8,472,623 B2
(45) Date of Patent: Jun. 25, 2013

(54) CONTENT DATA, TRANSMITTING APPARATUS, RECEIVING APPARATUS AND DECODING METHOD

(75) Inventors: Masaru Fukushima, Yokohama (JP); Masaomi Satake, Yokohama (JP)

(73) Assignee: Kyocera Corporation, Kyoto (JP)

( * ) Notice: Subject to any disclaimer, the term of this patent is extended or adjusted under 35 U.S.C. 154(b) by 775 days.

(21) Appl. No.: 12/305,860

(22) PCT Filed: Jun. 28, 2007

(86) PCT No.: PCT/JP2007/063025
§ 371 (c)(1),
(2), (4) Date: Mar. 9, 2010

(87) PCT Pub. No.: WO2008/001860
PCT Pub. Date: Jan. 3, 2008

(65) Prior Publication Data
US 2010/0316216 A1    Dec. 16, 2010

(30) Foreign Application Priority Data
Jun. 29, 2006 (JP) .................................. 2006-179555

(51) Int. Cl.
*H04L 29/06* (2006.01)

(52) U.S. Cl.
USPC ................. 380/42; 705/50; 380/46; 380/206; 380/263

(58) Field of Classification Search
USPC ............................................. 380/42, 46, 263
See application file for complete search history.

(56) References Cited

U.S. PATENT DOCUMENTS 6,792,111 B1 * 9/2004 Italia et al. .................... 380/263
7,636,439 B2  12/2009 Nakabayashi et al.
2001/0030963 A1 * 10/2001 Yoshimura et al. .......... 370/393
2004/0083177 A1 *  4/2004 Chen et al. ...................... 705/50
2006/0056625 A1 *  3/2006 Nakabayashi et al. ......... 380/46

FOREIGN PATENT DOCUMENTS

| JP | 06-075524 | 3/1994 |
| JP | 2000-138668 | 5/2000 |
| JP | 2001-339386 | 12/2001 |
| JP | 2002-026963 | 1/2002 |
| JP | 2006-109428 | 4/2006 |

OTHER PUBLICATIONS

Korean language office action dated Sep. 27, 2010 and its English language translation for corresponding Korean application 1020087031559.

(Continued)

*Primary Examiner* — Taghi Arani
*Assistant Examiner* — Jason Lee
(74) *Attorney, Agent, or Firm* — DLA Piper LLP (US)

(57) ABSTRACT

A transmitting apparatus 100 includes an initialization vector generating unit 110 for generating initialization vector IV1-IV5 for encrypting stream data with a stream encryption method, wherein the initialization vector is changed at every initialization intervals defined by a stream encryption module; an initialization packet generating unit 140 for generating an initialization packet IP containing an initialization vector used when stream data following the initialization packet are encrypted and another initialization vector used when another stream data different from the stream data following the initialization packet are encrypted; an encryption unit 120 for initializing the stream encryption module using a generated initialization vector, and performing stream encryption on stream data following the initialization vector; an encryption packet generating unit 130 for generating an encryption packet EP containing stream-encrypted data; and a transmission unit 150 for transmitting the initialization packet IP and the encryption packet EP by broadcast/multicast.

9 Claims, 9 Drawing Sheets

OTHER PUBLICATIONS

Korean language office action dated Jun. 28, 2011 and its English language translation for corresponding Korean application 1020087031559.

Chinese language office action dated Oct. 11, 2010 and its English language office action for corresponding Chinese application 200780024567.0.

Japanese language office action dated Nov. 8, 2011 and its English language translation for corresponding Japanese application 2008522629.

Japanese language office action dated May 8, 2012 and its English language translation issued in corresponding Japanese application 2008522629.

* cited by examiner

CONTENT DATA, TRANSMITTING APPARATUS, RECEIVING APPARATUS AND DECODING METHOD

CROSS REFERENCE TO RELATED APPLICATION

This application claims priority to and the benefit of Japanese Patent Application No. 2006-179555 filed on Jun. 29, 2006, the entire content of which is incorporated herein by reference.

FIELD OF THE INVENTION

The present invention relates to content data, a transmitting apparatus, a receiving apparatus and a decoding method, and more specifically, to a technique improving resilience against transmission/reception errors of packets (packet loss) encrypted with a stream encryption method and transmitted by broadcast/multicast.

DESCRIPTION OF THE RELATED ART

Conventional encryption methods can be classified roughly into a block encryption method, which encrypts plaintext on the block basis, and a stream encryption method, which encrypts plaintext by one bit (or some bits). Since the stream encryption method can be embodied with simple algorithm, which allows high speed signal processing, the stream encryption method can be easily implemented in apparatus with low computation throughput such as cell phones, STBs (Set Top Box), PDAs (Personal digital Assistants) and the like. In addition, as processing plaintext by one bit without delay, the stream encryption method is suitable to encrypt data for communication or broadcasting. For such stream encryption method, techniques for improving security of encrypted data have been mainly developed. For example, there has been suggested an encryption method that increases randomness in key stream generation in order to be robust and secure against attacks (see Japanese Patent Application Laid Open No. H6-75524 (paragraphs 0009-0016 and FIG. 1)).

DISCLOSURE OF THE INVENTION

Problems to be Solved by the Invention

As described above, conventional stream encryption techniques are mainly to improve resilience against attacks, so that it has been late to develop techniques for improving resilience against errors on a transmission path such as packet loss. Specifically, on the radio transmission path of broadcast/multicast, since packet retransmission is not performed even though probability of packet loss is highly increased, damage becomes large when errors occur. Therefore, techniques for improving error resilience have been required.

The stream encryption methods are classified into an external-synchronizing stream encryption method and an internal-synchronizing stream encryption method. FIG. 8 is a block diagram illustrating a conventional external-synchronizing stream encryption method. As shown in FIG. 8, the external-synchronizing stream encryption method can generate a key stream without depending on ciphertext or the like. When a bit error occurs, only the corresponding bits become the error, so that in subsequent processes decryption can be performed without being affected. When such external-synchronizing stream encryption method is employed in communication/broadcast, a receiver needs to receive regularly initial values (hereinafter referred to as "initialization vector") that a transmitter used for encryption, and generate a key stream by initializing an encryption module (in stream encryption method, the encryption module is the same as decryption module) with the initialization vector. In case that the initialization packet is lost, the receiver cannot perform decryption until an initialization packet containing a new initialization vector is acquired.

FIG. 9 is a timing chart illustrating a process for initialization packet loss in broadcasting data including stream-encrypted data according to the related art. As shown, when initialization intervals K1, K2 and K3 are variable without being fixed (variable-length initialization timing), the receiver cannot predict when an initialization packet is transmitted, so that it cannot recognize which packet is the initialization packet. Therefore, in order to prevent decrypting ciphertext incorrectly in wrong decryption processes, subsequent decryption processes are stopped until a new initialization packet is received.

For example, FIG. 9(*a*) shows a case of normal decryption (normal reception) when there is no packet loss. In the initialization interval K1 of an initialization vector IV1, a shifter is initialized based on the IV1 and an encryption key. A key stream generating unit generates a key stream from content of the shifter and decrypts encrypted packets by performing XOR on the generated "key stream" and "encryption packet data". Similar decryptions are performed respectively during initialization intervals K2, K3 with initialization vectors IV2, IV3.

FIG. 9(*b*) shows a case that packet loss (reception errors) occurs. As shown, packet loss occurs at time ST1 in the initialization interval K1. Within a period from the time ST1 to the time ST2 at which a packet containing a new initialization vector IV2 is arrived, decryption is stopped in order to prevent decrypting plaintext incorrectly in wrong decryption processes. And, after the packet containing the new initialization vector IV2 is received, decryption is restarted as usual. In such processing method for packet loss, for example, when a important frame (I frame of MPEG) or the like of image data is arranged within the decryption stop period, there are problems that following images to be reconstructed based on the important frame can not be reproduced.

In conventional communication, since cable transmission paths were mainly used, frequency of packet loss is extremely low, and even though packet loss occurs, it was easy to recover lost packets by retransmitting packets or the like. However, in a communication/broadcast system in which retransmission is not performed basically such as general broadcast/multicast, it is difficult to recover lost packets. As radio technology is developed, there are many cases that a radio transmission path is used as a transmission path of broadcast/multicast (typically, one segment broadcasting for a cell phone), and therefore frequency of packet loss is considerably increased as compared with cable transmission path.

An object of the present invention is to provide a stream encryption technique (data, apparatus, method and the like) that improves error resilience when packet loss (reception errors) occurs.

Means for Solving the Problem

To solve the problem, content data (data structure) according to the present invention are content data encrypted with a stream encryption method and transmitted by broadcast/multicast, and include:

at least, an initialization packet containing an initialization vector used when following stream data (which follows the initialization packet) are encrypted, wherein the initialization vector is changed at every initialization intervals defined by a stream encryption module (algorithm); and an encryption packet containing stream-encrypted data generated by encrypting the following stream data with the initialization vector, wherein the initialization packet further contains another initialization vector used when another stream data (typically, stream data preceding the stream data) different from the following stream data are encrypted.

Content data according to one embodiment of the present invention, is characterized in that, when a number of the encryption packets encrypted at each initialization interval varies, the initialization packet further contains a total byte number of the another stream data encrypted with the another initialization vector contained in the initialization packet (to be correlated with the another vector).

Another initialization vector may be a plurality of initialization vectors.

A transmitting apparatus (encoding apparatus) according to another embodiment of the present invention, includes:

an initialization vector generating unit (pseudorandom number generator) for generating an initialization vector for encrypting stream data with a stream encryption method, wherein the initialization vector is changed at every initialization intervals defined by a stream encryption module (algorithm);

an initialization packet generating unit for generating an initialization packet containing an initialization vector used when stream data following the initialization packet are encrypted, and another initialization vector used when another stream data (typically, stream data which precedes the stream data following the initialization packet) different from the stream data following the initialization packet are encrypted;

an encryption unit (CPU for operating and executing a stream encryption module or the like) for initializing the stream encryption module (hardware module, software module, or module which combines these) by using the initialization vector generated by the initialization vector generating unit, and performing stream encryption on stream data following the initialization vector by using the initialized stream encryption module;

an encryption packet generating unit for generating an encryption packet containing stream-encrypted data encrypted by the encryption unit; and a transmission unit for transmitting the initialization packet and the encryption packet by broadcast/multicast.

A transmitting apparatus (encoding apparatus) according to still another embodiment of the present invention is characterized in that, when a number of the encryption packets encrypted at each initialization interval varies, the initialization packet further contains a total byte number of the another stream data encrypted with the another encryption vector contained in the initialization packet (to be correlated with the corresponding another vector).

Another initialization vector may be a plurality of initialization vectors.

A receiving apparatus (decoding apparatus) according to still another embodiment of the present invention, includes:

a reception unit (reception circuit or the like) for receiving an initialization packet containing an initialization vector for encrypting stream data following the initialization packet and another initialization vector for encrypting another stream data different from the stream data following the initialization packet, and an encryption packet containing stream-encrypted data encrypted with the initialization vector;

a decryption unit (circuit, CPU for executing the encryption module, or the like) for initializing a stream encryption module using the initialization vector contained in the initialization packet and decrypting stream-encrypted data contained in the encryption packet;

a detection unit for detecting a reception error (packet loss) of a packet received by the reception unit; and a control unit (circuit, CPU for executing the encryption module, or the like) for controlling the decryption unit, when a reception error of a packet is detected by the detection unit, so as to decrypt stream-encrypted data contained in an encryption packet following the packet in the reception error by using the another initialization vector contained in another initialization packet that is different from an initialization packet supposed to be used for decryption of the packet in the reception error (for example, in case that another initialization vector is for encrypting previous data stream, and when being informed of detection of the reception error, the control unit stops decryption until a next initialization packet is received. When the next initialization packet is received, the control unit restarts decryption of stream-encrypted data contained in an encryption packet which follows a packet in the reception error and whose decryption is stopped, by using another initialization vector contained in the next initialization packet).

A receiving apparatus (decoding apparatus) according to still another embodiment of the present invention is characterized in that, when a number of the encryption packets encrypted at each initialization interval varies, the initialization packet further contains a total byte number of the another stream data encrypted with the another initialization vector contained in the initialization packet (to be correlated with the another vector), and the control unit controls the decryption unit, when a reception error of a packet is detected by the detection unit, so as to decrypt stream-encrypted data contained in an encryption packet following the packet in the reception error by using the another initialization vector and the total byte number which are contained in the another initialization packet.

A decoding method (receiving method) according to still another embodiment of the present invention, includes:

receiving step for receiving an initialization packet containing an initialization vector for encrypting stream data following the initialization packet and another initialization vector for encrypting another stream data different from the stream data following the initialization packet, and an encryption packet containing stream-encrypted data encrypted with the initialization vector, with a reception unit;

decrypting step for initializing stream encryption module using the initialization vector contained in the initialization packet, and decrypting stream-encrypted data contained in the encryption packet with the stream encryption module;

detecting step for detecting a reception error of a packet received at the receiving step; and controlling step for controlling the decrypting step, when a reception error of a packet is detected at the detecting step, so as to decrypt stream-encrypted data contained in an encryption packet following the packet in the reception error by using the another initialization vector contained in another initialization packet that is different from an initialization packet supposed to be used for decryption of the packet in the reception error (for example, in case that another initialization vector is for encrypting previous data stream, and when detection of the reception error is informed, decryption is stopped until a next initialization packet is received. When the next initialization packet is received, the controlling step restarts decrypting stream-encrypted data contained in a packet which follows the packet in the reception error and whose decryption is stopped by using another initialization vector contained in the next initialization packet).

As described above, solving means of the present invention are described as data, apparatus and method, but the present invention can be embodied with another type of constitution (in other words, data structure, method, program and recording medium recording the program) corresponding to the solving means substantially. Therefore, it will be understood that these are included within the scope of the present invention Effect of the Invention According to tire present invention, it is possible to provide and reproduce contents (program) with high quality by improving error resilience when encryption packet loss occurs in general broadcast/multicast in which packet retransmission is not performed. Specifically, in broadcast/multicast using radio transmission paths in which probability of packet loss is notably increased, it is possible to minimize damage by errors and improve error resilience considerably.

BEST MODE FOR CARRYING OUT THE INVENTION

Figure 1:
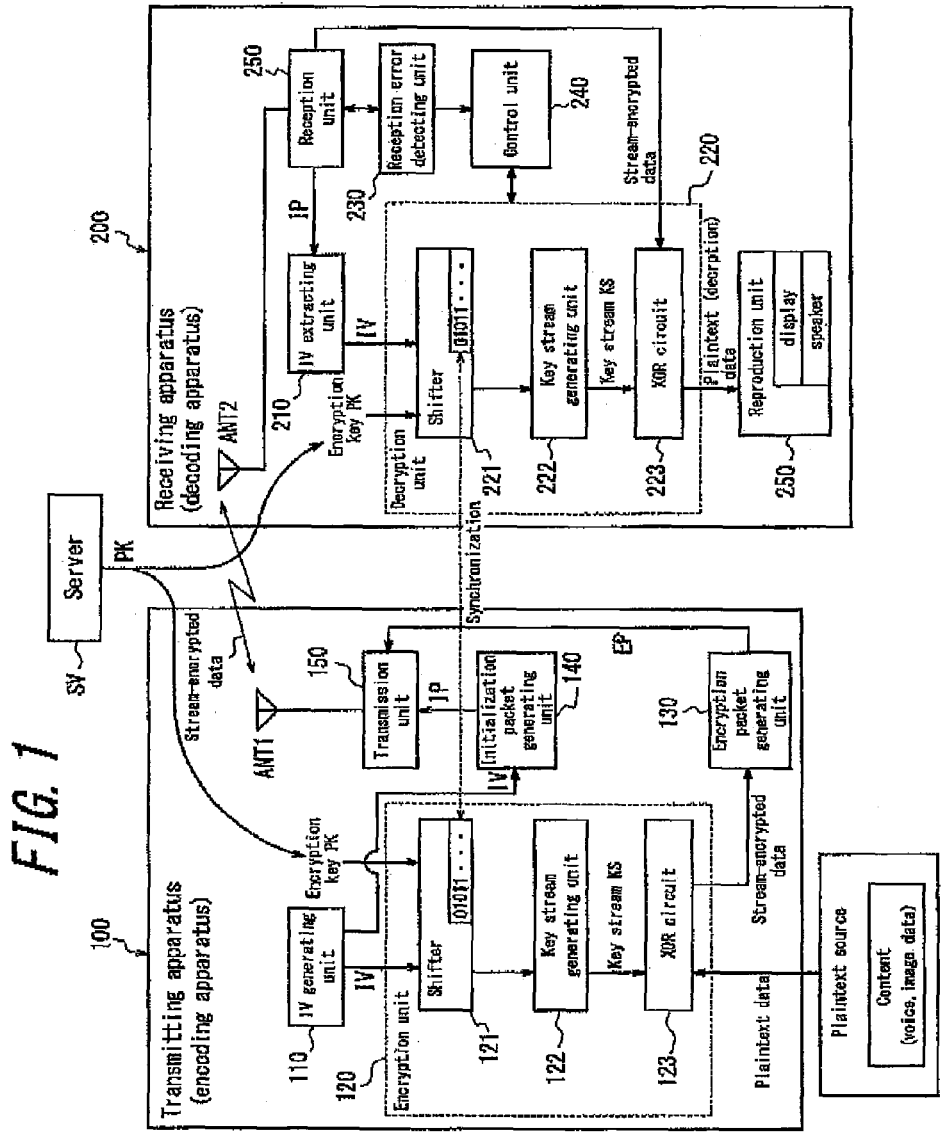
FIG. 1 is a block diagram illustrating a stream encryption communication system comprising a transmitting apparatus (encoding apparatus) and a receiving apparatus (decoding apparatus) according to the present invention.

Preferred embodiments of the present invention will now be described with reference to the accompanying drawings. FIG. 1 is a block diagram illustrating a stream encryption communication system comprising a transmitting apparatus (encoding apparatus) and a receiving apparatus (decoding apparatus) according to the present invention. As shown in FIG. 1, the stream encryption communication system according to the present invention comprises a transmitting apparatus (encoding apparatus) 100 and a receiving apparatus (decoding apparatus) 200.

<Constitution of the Transmitting Apparatus (Encoding Apparatus)>

The transmitting apparatus 100 has an initialization vector (IV) generating unit 110, an encryption unit 120, an encryption packet generating unit 130, an initialization packet generating unit 140, a transmission unit 150 and an antenna ANT1. The encryption unit 120 has a shifter (LFSR: Linear Feedback Shift Register) 121, a key stream generating unit 122 and an XOR (exclusive OR operation) circuit 123. The initialization vector generating unit 110 generates initialization vectors IV irregularly. The shifter (LFSR) 121 is initialized based on the initialization vector IV and an encryption key (public key) PK provided by external server SV or the like. The key stream generating unit 122 generates a key stream KS from content of the shifter (LFSR), and provides it to the XOR circuit 123. After that, the shifter (LFSR) 121 performs a shift operation based on steam encryption algorithm. The XOR circuit 123 converts plaintext data into stream-encrypted data by performing XOR between the key stream KS and plaintext data acquired from plaintext source (program contents data and the like). Such shift operation and XOR calculation are continued until the initialization vector IV is changed. When the initialization vector IV is changed, the encryption unit (i.e., encryption algorithm (module)) is initialized, and a new key stream KS is generated. And the processes above described are repeated.

The XOR circuit 123 provides stream-encrypted data to the encryption packet generating unit 130, and the encryption packet generating unit 130 makes an encryption packet EP by adding a header and the like to the provided stream-encrypted data. The encryption packet made by the encryption packet generating unit 130 is sent to the transmission unit 150. The initialization packet generating unit 140 generates an initialization packet IP_current containing an initialization vector IV_current used when stream data were encrypted and an initialization vector IV_previous which precedes the initialization vector IV (by one or more), and provides it to the transmission unit 150. The transmission unit 150 received the initialization packet IP and the encryption packet EP generates a packet stream (transport stream) constructed with these packets. Current initialization packet IP_current contains an initialization vector IV_current used for encrypting data following the packet, a previous initialization vector IV_previous, and a total byte number IV_previous_num of data encrypted with the previous initialization vector IV_previous. When a period in which packets are decrypted with the previous initialization vector IV_previous is significant, or the like, the initialization vector and the corresponding total byte number are contained in another initialization packet IP (for example, IP for one previous period of the significant period). Therefore, even though there are errors in the current initialization packet and the following initialization packet, the receiving apparatus can reproduce contents (program) in a significant period normally by performing initialization and decryption using the IV and the total byte number contained in another previous (following) initialization packet. Several processes such as demodulation, multiplex, and the like are performed on the packet stream, and then the packet stream is transmitted (broadcasted) through the antenna ANT 1. Accordingly, the transmitting apparatus further has a modulator, a multiplexer for multiplexing audio, image, data, etc., and the like which are not shown, but explanations about these elements are omitted.

<Constitution of the Receiving Apparatus (Decoding Apparatus)>

The receiving apparatus 200 has an initialization vector (IV) extracting unit 210, a decryption unit 220, a reception error detecting unit 230, a control unit 240, a reception unit 250 and an antenna ANT2. The decryption unit 220 has a shifter (LFSR: Linear Feedback Shift Register) 221, a key stream generating unit 222 and an XOR (exclusive OR operation) circuit 223. In addition, the receiving apparatus has a demodulator, a demultiplexer and the like, which are not shown. In the stream encryption method, since the same algorithm can be used as decryption algorithm (i.e. decryption module) used in decryption and as encryption algorithm (i.e. encryption module) used in encryption, decryption algorithm or decryption module may be referred to as encryption algorithm.

The initialization vector extracting unit 210 extracts an initialization vector IV from an initialization packet IP acquired by the reception unit 250, and provides it to the shifter (LFSR) 221. The shifter (LFSR) 221 is initialized based on the extracted initialization vector IV and an encryption key (public key) PK from an external server SV or the like. The key stream generating unit 222 generates a key stream KS from content of the shifter and provides it to the XOR circuit 223. And then, the shifter (LFSR) 221 performs a shift operation based on stream encryption algorithm. The XOR circuit 223 converts (decrypts) stream-encrypted data into plaintext data by performing XOR on the key stream KS and stream-encrypted data acquired by the reception unit 250. Such shift operation and XOR calculation are continued until the initialization vector IV is changed. When the initialization vector IV h changed, a new key stream KS is generated by the decryption unit (i.e. decryption algorithm (module)) being initialized, and above-described processes are repeated. In this way, decryption processes are performed with synchronizing correlation state between the shifter of the decryption unit and plaintext data at the receiving apparatus side with correlation state between the shifter of the encryption unit and encrypted data at the transmitting apparatus side. When this synchronization is lost, decryption cannot be performed correctly. With regard to this, it will be described below.

<Solution for Synchronization Deviation>

A method for solving the synchronization deviation will be described. When there is a packet loss at the receiving (decoding) side, deviation between state of the shift register and state of the shift register at the encryption module side, which is so-called "synchronization deviation", occurs as much as the lost bits. When the synchronization deviation occurs, encrypted data cannot be decrypted accurately, and inaccurate plaintext is decrypted and generated. In the header of transport stream (TS) packet, a continuity marker (Continuity_Counter) is inserted. This continuity marker is a 4-bit counter that is increased by one in the same PID. At the receiving side, the number of packets related to the packet loss can be detected by detecting discontinuity of the counter. In case of null packets (i.e., empty packets having no payload), since the continuity marker is not increased, it is possible to exclude the null packets from the number of lost packets.

For example, in case of a TS stream whose adaptation field control value is "01", since a packet has a fixed length of 188 bytes (4 bytes for a header and 184 bytes for payload), the total number of lost bits which affects synchronization of the shifter can be derived as follows:

The total number of lost bits=the number of lost packets×184×8

If a key stream stored in the shifter when an error occurred is shifted by the total number of lost bits derived by the number of lost packets, it is possible to "re-synchronize" state of the shifter at the receiving (decoding) side to state of the shifter at the encoding (transmitting) side. In other words, the decryption process can be restarted by solving the synchronization deviation using information (for example, continuity marker and packet length data) by which the total number of lost bits included in lost packets can be detected.

Figure 2:
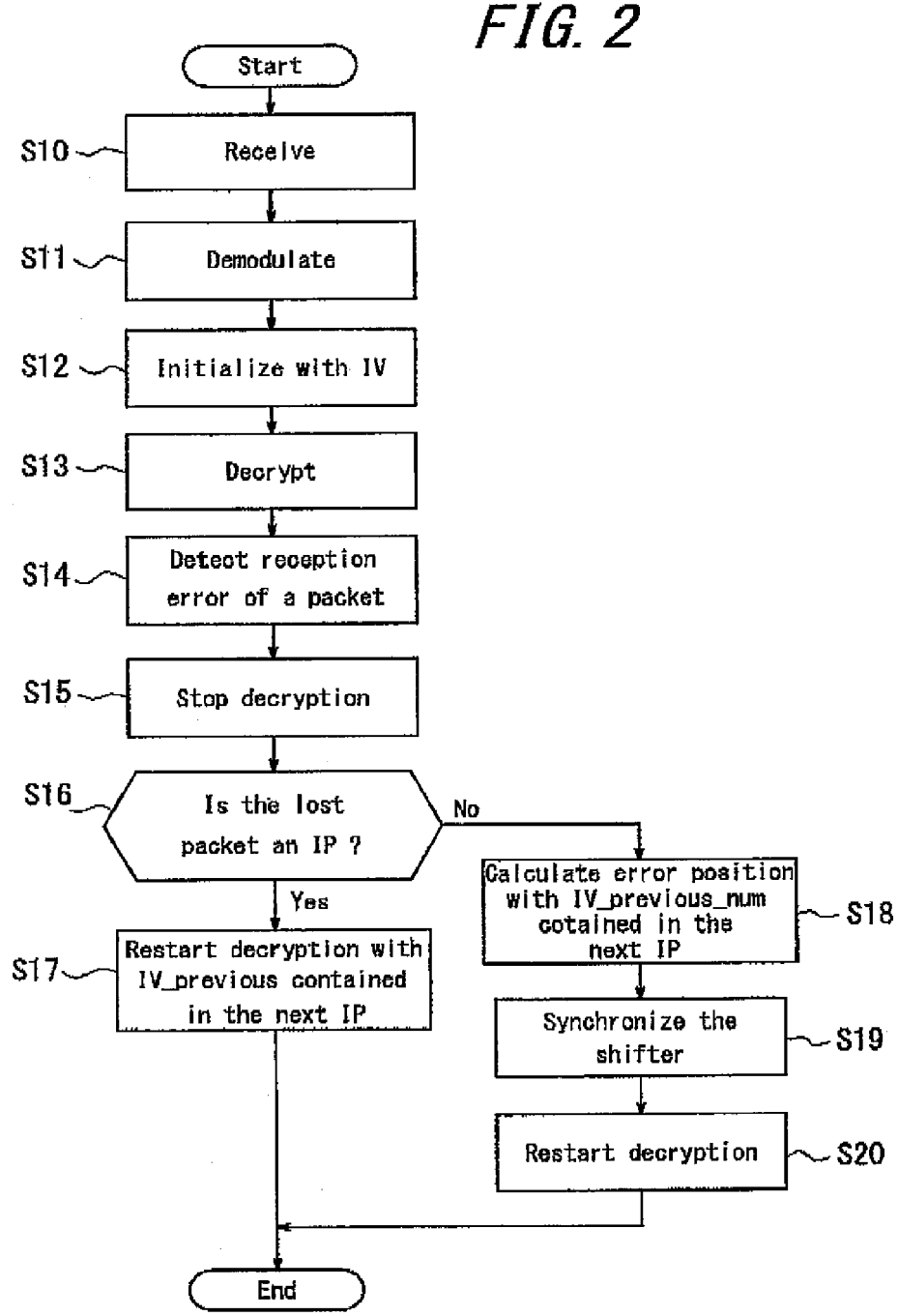
FIG. 2 is a flow chart illustrating a recovery process of the receiving apparatus (decoding apparatus) according to the present invention when there is packet loss.

FIG. 2 is a flow chart illustrating a recovery process of the receiving apparatus (decoding apparatus) according to the present invention when there is packet loss. As shown in FIG. 2, at step S10, the receiving apparatus receives carriers (modulated waves) carrying an initialization packet IP containing an initialization vector IV-current used when stream data were encrypted, a previous initialization vector IV-previous which precedes the initialization vector (by one or more), and a total byte number IV-previous-num of data encrypted with the previous initialization vector IV-previous, and an encryption packet EP containing stream-encrypted date which are encrypted with the initialization vector.

Next, the received carriers are demodulated, and TS packets including the initialization packet IP and a series of encryption packets EP containing stream-encrypted data encrypted with the initialization vector IV are acquired (S11). In one segment broadcasting for a cell phone, TS packets are generally de-multiplexed into packets of audio information, image information and data broadcasting information, and are provided to an audio decoding unit, an image decoding unit, and a data decoding unit, respectively. Next, stream encryption module is initialized with the current initialization vector IV-current contained in the initialization packet IP (S12), and stream encrypted data contained in the encryption packets EP are decrypted (S13).

When receiving packets, the receiving apparatus always detects a reception error (packet loss) of packets being received with Reed Solomon codes or the like, and when detecting errors, it stops subsequent decryption processes (S14). And, the receiving apparatus waits to receive the next initialization packet IP, and after receiving it, it determines whether the packet in reception error (lost packet) is an initialization packet IP (S16). Specifically, the determination can be performed by using IV_previous_num and the number of packets that are received normally. When a packet in reception error (lost packet) is determined as an initialization packet IP, the receiving apparatus restarts decryption with a previous initialization packet IV_previous contained in the next initialization packet IP (S17). When a packet in reception error (lost packet) is not determined as an initialization packet IP, since the lost packet is supposed as an encryption packet EP, it is necessary to acquire a head position of a following encryption packet EP in order to restart decryption of the following encryption packet EP. In the present invention, the head position of an encryption packet (the number of bits after the error position) which is received normally and follows the error packet is derived (S18) by using "the total byte number IV_previous_num" of data encrypted with the previous initialization vector contained in the next initialization IP and the number of packets which are normally received from being recovered from the error to the next initialization packet (or, the number of packets normally received and the number of error packets from the initialization packet to the error). The number of shifts for synchronizing the shifter can be calculated by subtracting the number of bits after initialization from the head position. The shifter performs shift operations by the number of shifts so that the position of the shifter in the decryption unit is synchronized with that of the shifter at encryption (S19). And, decryption is restarted with the synchronized shifter of the decryption unit (S20).

Figure 3:
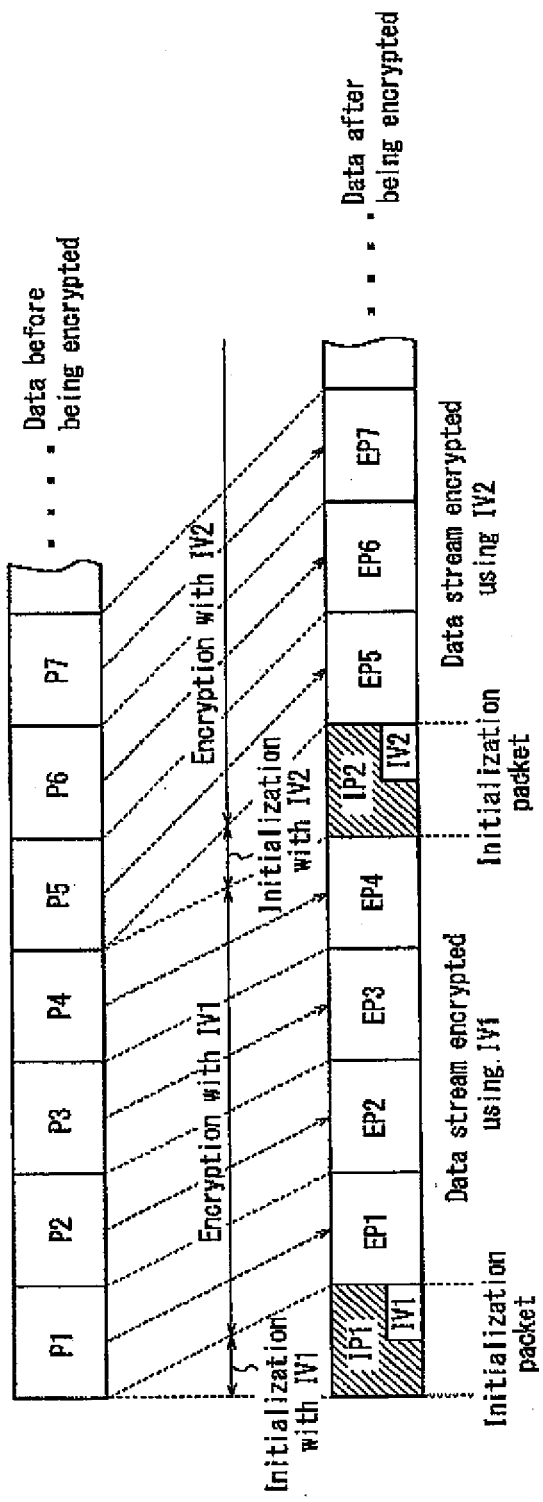
FIG. 3 shows general packet arrangement when a packet group (data stream) is encrypted with a stream encryption method.

FIG. 3 shows general packet arrangement when a packet group (data stream) is encrypted with a stream encryption method. As shown, there are plaintext packets P1~P7 including data before encryption. When plaintext packets P1~P4 are encrypted with stream encryption algorithm initialized with an initialization vector IV1, the plaintext packets P1~P4 are converted into encryption packets EP1~EP4, respectively. An initialization packet IP1 containing the initialization vector IV1 is arranged before a series of encryption packets EP1~EP4 encrypted with the initialization vector IV1. Similarly, following data are encrypted, and an initialization packet IP2 containing an initialization vector IV2 is arranged between a series of encryption packets EP5~EP7 encrypted with the initialization vector IV2 and a preceding series of encryption packets EP1~EP4. In the present invention, additional information is further contained in the initialization packet IP in order to improve error (packet loss) resilience.

Figure 4:
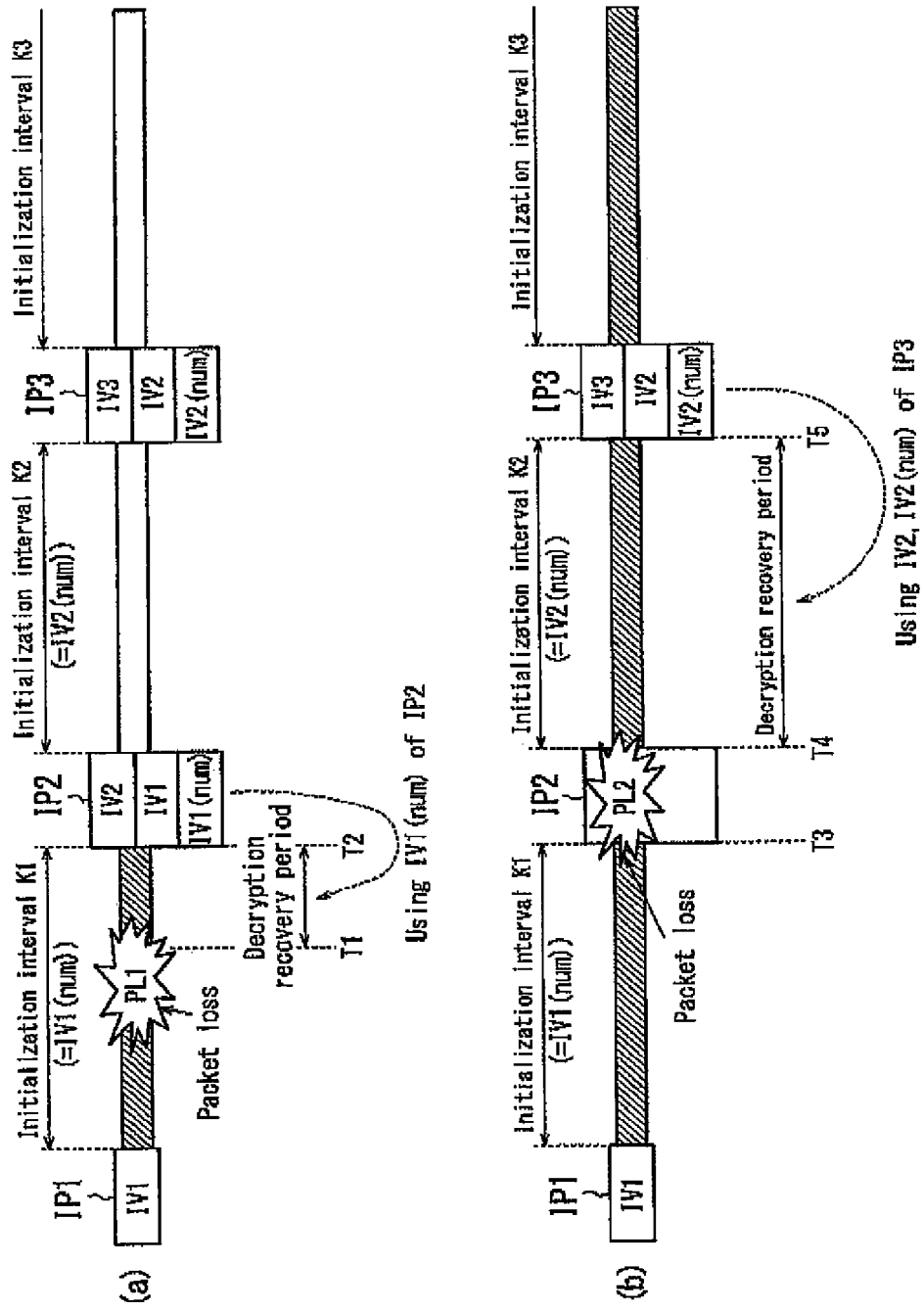
FIG. 4 is a timing chart illustrating a recovery process of the receiving apparatus (decoding apparatus) according to the present invention when packet loss is detected.

FIG. 4 is a timing chart illustrating a recovery process of the receiving apparatus (decoding apparatus) according to the present invention when packet loss is detected. As shown in FIGS. 4(a) and (b), an initialization packet IP2 contains a current initialization vector IV2, a previous initialization vector IV1, and a total byte number IV1(num) (=an initialization interval K1) of data encrypted with the previous initialization vector IV1. Similarly, an initialization packet IP3 contains a current initialization vector IV3, the previous initialization vector IV2, and a total byte number IV2(num) (=an initialization interval K2) of data encrypted with the previous initialization vector IV2.

<Decryption Recovery Process for Encryption Packet Loss>

FIG. 4(a) shows a decryption recovery process when packet loss PL1 occurs in the initialization interval K1. As shown, the packet loss PL1 occurs within the initialization interval K1. The receiving apparatus stops decryption from a point [T1] at which reception is performed normally, and stores a plurality of encryption packets EP normally received until a point [T2] at which the initialization packet IP2 is received, into a buffer (not shown). The receiving apparatus calculates a synchronization position of the shifter by subtracting the number of bytes normally received in the decryption recovery period [T1-T2] derived from the number of encryption packets EP normally received and stored in the buffer from the total byte number IV1(num) (=the initialization interval K1) of data encrypted with the previous initialization vector IV1 contained in the received initialization packet IP2. By shifting values in the shifter to the synchronization position calculated, the shifter is synchronized, and decryption of encryption packets EP received in the decryption recovery period [T1-T2] is restarted. Therefore, according to the present invention, it is possible to decrypt packets received in the decryption recovery period [T1-T2], which could not be recovered in the past.

<Decryption Recovery Process for Initialization Packet Loss>

FIG. 4(b) shows a decryption recovery process when packet loss PL2 of the initialization packet IP2 occurs. As shown, packet loss PL2 occurs when the initialization packet IP2 is received. The receiving apparatus stops decryption from a point [T4] at which reception is performed normally, and stores a plurality of encryption packets EP received until a point [T5] at which the initialization packet IP3 is received into a buffer (not shown). Encryption module is initialized with the previous initialization vector IV2 contained in the initialization packet IP3 received, and decrypts packets received in the recovery period [T4-T5]. Therefore, according to the present invention, it is possible to decrypt packets received in the decryption recovery period [T4-T5], which could not be recovered in the past.

<Decryption Recovery Process of Continuous Initialization Packet Loss>

Figure 5:
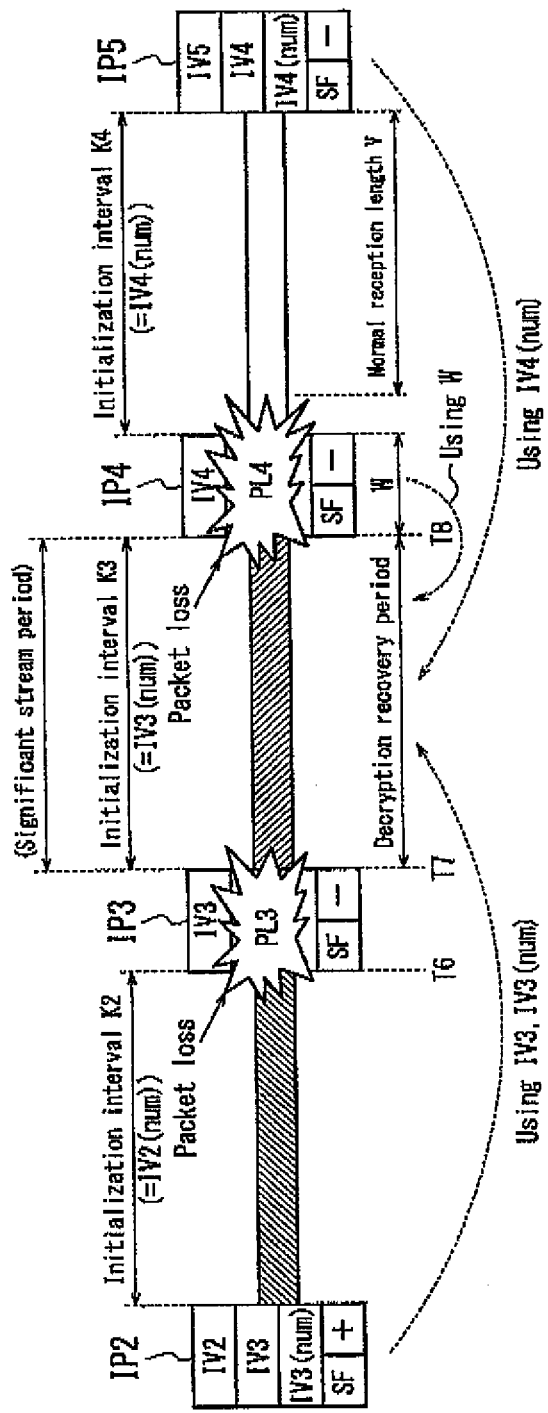
FIG. 5 is a timing chart illustrating a recovery process of the receiving apparatus (decoding apparatus) according to the present invention when packet losses are detected.

FIG. 5 is a timing chart illustrating a recovery process of the receiving apparatus (decoding apparatus) according to the present invention when packet losses are detected. As shown in FIG. 5, an initialization packet IP2 contains a current initialization vector IV2, a following initialization vector IV3, a total byte number IV3(num) (=an initialization interval K3) of data encrypted with the following initialization vector IV3, and a sign field SF indicating which of previous one (-) and following one (+) is included as another initialization vector. In this example, since the initialization interval K3 is a significant stream period, the initialization packet IP2 is shown as having + sign in the SF field and containing the following initialization vector and the total byte number of data encrypted with the following initialization vector. Other initialization packets IP3~IP5 have - signs in SF fields, and contain a previous initialization vector, and a total byte number of data encrypted the previous initialization vector, respectively. In other words, the receiving apparatus improves error resilience by inserting information needed to decrypt packets in the initialization interval K3, which is a significant period, into previous and following initialization packets.

As shown, packet losses PL3, PL4 occur when initialization packets IP3, IP4 are received. The receiving apparatus stops decryption from a point [T7] at which there is normal reception after the packet loss PL3 occurred, and stores a plurality of encryption packets EP received normally into a buffer (not shown) until a point [T8] at which the packet loss PL4 occurs. And then, since there is an error in reception of the initialization packet IP4, decryption is not restarted, and encryption packets (normal reception length V) received normally in the initialization interval K4 are also stored into the buffer.

After an initialization packet IP5 is received, it becomes clear that packets received at the initialization interval K3 are encrypted with another initialization vector IV based on IV3 (num) of the initialization packet IP2, a length W of the initialization packet IP4 previously known, an IV4(num) of the initialization packet IP5 and the normal reception length V in the initialization interval K4. The receiving apparatus initializes encryption module with the IV3 of the initialization packet IP2, and decrypts packets in the decryption recovery period [T7-T8], Packets of the normal reception length V in the initialization interval K4 axe decrypted using information in the initialization packet IP5 similarly to the case shown in FIG. 4. Therefore, according to the present invention, even if continuous errors occur in two initialization packets, it is possible to decrypt packets normally, which could not be recovered in the past.

In the case shown in FIG. 5, in order to deal With the packet loss of an initialization packet IP3 for "initialization interval K3" which is a significant stream period, the initialization packet IP2 contains the initialization vector IV3 and IV3 (num), and the initialization packet IP5 contains IV(num). In other words, a packet (IP2) preceding a significant period, and a packet (IP5) following the significant period raise packet loss resilience only in the period. However, the packet (IP5) cannot deal with packet loss of an initialization packet IP6 following it. Similarly, the packet (IP2) cannot deal with packet loss of the initialization packet IP1 preceding it. In other words, when a significant stream period comes near, there are cases difficult to deal with using the data format of FIG. 5. In such cases, there is no choice but to employ constitution capable of raising error resilience in a period that is more significant. In addition, the data format shown in FIG. 5 allows decrypting data even though adjacent two initialization packets cannot be received by errors, but with the format the receiving apparatus cannot deal with cases that errors occur continuously in three or more packets. For dealing with the cases when a significant stream period comes near, or three or more initialization packets are continuously lost, a data format will be described by referring to FIG. 6.

<Decryption Recovery Process for Continuous Packet Losses of Three or More Initialization Packets>

Figure 6:
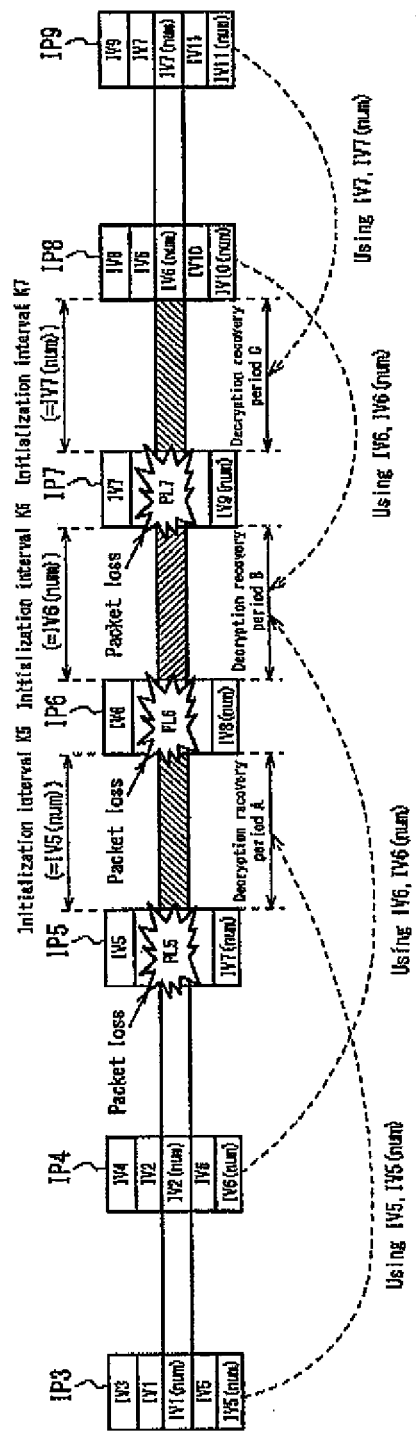
FIG. 6 is a timing chart illustrating a recovery process of the receiving apparatus (decoding apparatus) according to the present invention when packet losses are detected.

FIG. 6 is a timing chart illustrating a recovery process of the receiving apparatus (decoding apparatus) according to the present invention when packet losses are detected. As shown in FIG. 6, when three initialization packets IP5, IP6, IP7 are continuously lost, there exists a period in which decryption cannot be performed with the data format of FIG. 5 as described above. Therefore, in this embodiment of the present invention, one initialization packet contains a plurality of other initialization vectors as well as an initialization vector that the packet originally contains. For example, the initialization packet IP3 contains an initialization vector IV3 that the packet originally contains and a total byte number IV3(num) of data encrypted with the initialization vector IV3. Moreover, in this embodiment, as the other initialization vectors, the initialization packet IP3 contains an initialization vector IV1 and a total byte number IV1(num) of data encrypted the initialization vector IV1, and an initialization vector IV5 and a total byte number IV5(num) of data encrypted with the initialization vector IV5. In other words, one initialization packet contains a plurality of other initialization vectors as well as an original initialization vector, so that the initialization packet can support decryption at an initialization interval that follows it after two or more initialization intervals, and at an initialization interval that precedes it before one or more initialization intervals, and therefore it is possible to realize a transmission system with higher reliability. In this way, by providing redundancy to the initialization vector and the total byte number, even though packet losses PL5, PL6, PL7 occur continuously in initialization packets IP5, IP6, IP7, it is possible to perform decryption successfully in the initialization intervals K5, K6, K7 as decryption recovery periods A, B, C. In other words, packets in initialization intervals K5, K6, K7 can be decrypted with a set of IV5 and IV5(num) contained in the initialization packet IP3, a set of IV6 and IV6(num) contained in the initialization packet IP4, and a set of IV7 and IV7(num) contained in the initialization packet IP9, respectively. In addition, when an initialization packet IP2 (not shown) is lost, in other words when packet losses occur adjacently, since one initialization packet supports decryption, at an initialization interval following it two or more later and at an initialization interval preceding it one or more before, it is possible to perform decryption successfully in all periods relating to adjacent two packet loss groups. Therefore, error resilience is more improved.

<A Decryption Recovery Process of a Plurality of Packet Losses in an Initialization Interval>

Figure 7:
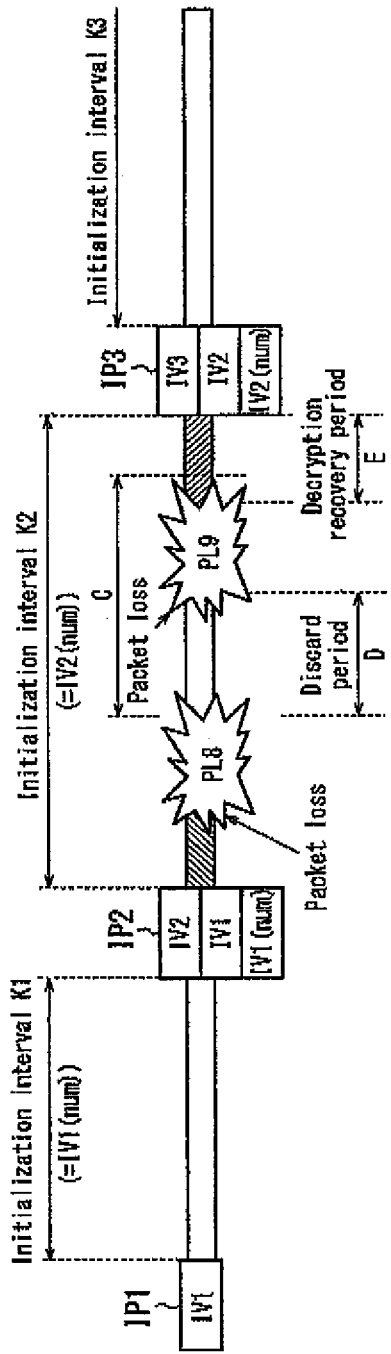
FIG. 7 is a timing chart illustrating a recovery process of the receiving apparatus (decoding apparatus) according to the present invention when packet losses are detected.
Figure 8:
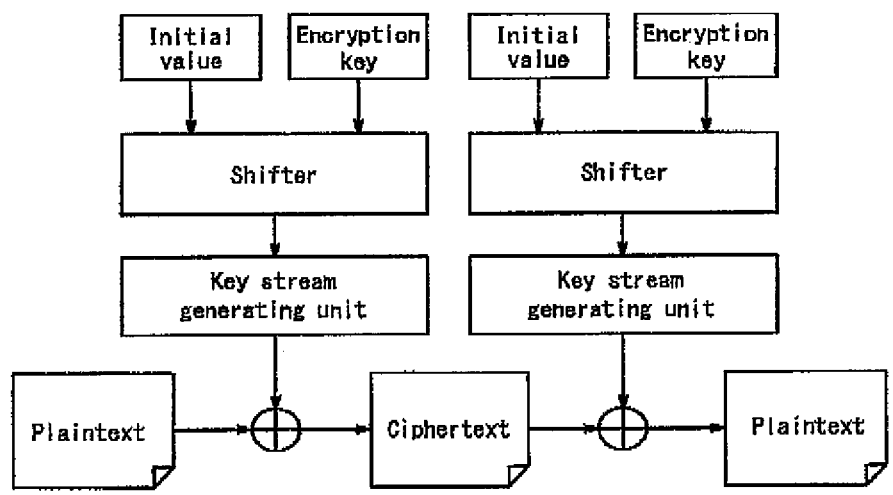
FIG. 8 is a block diagram illustrating a conventional external-synchronizing stream encryption method.
Figure 9:
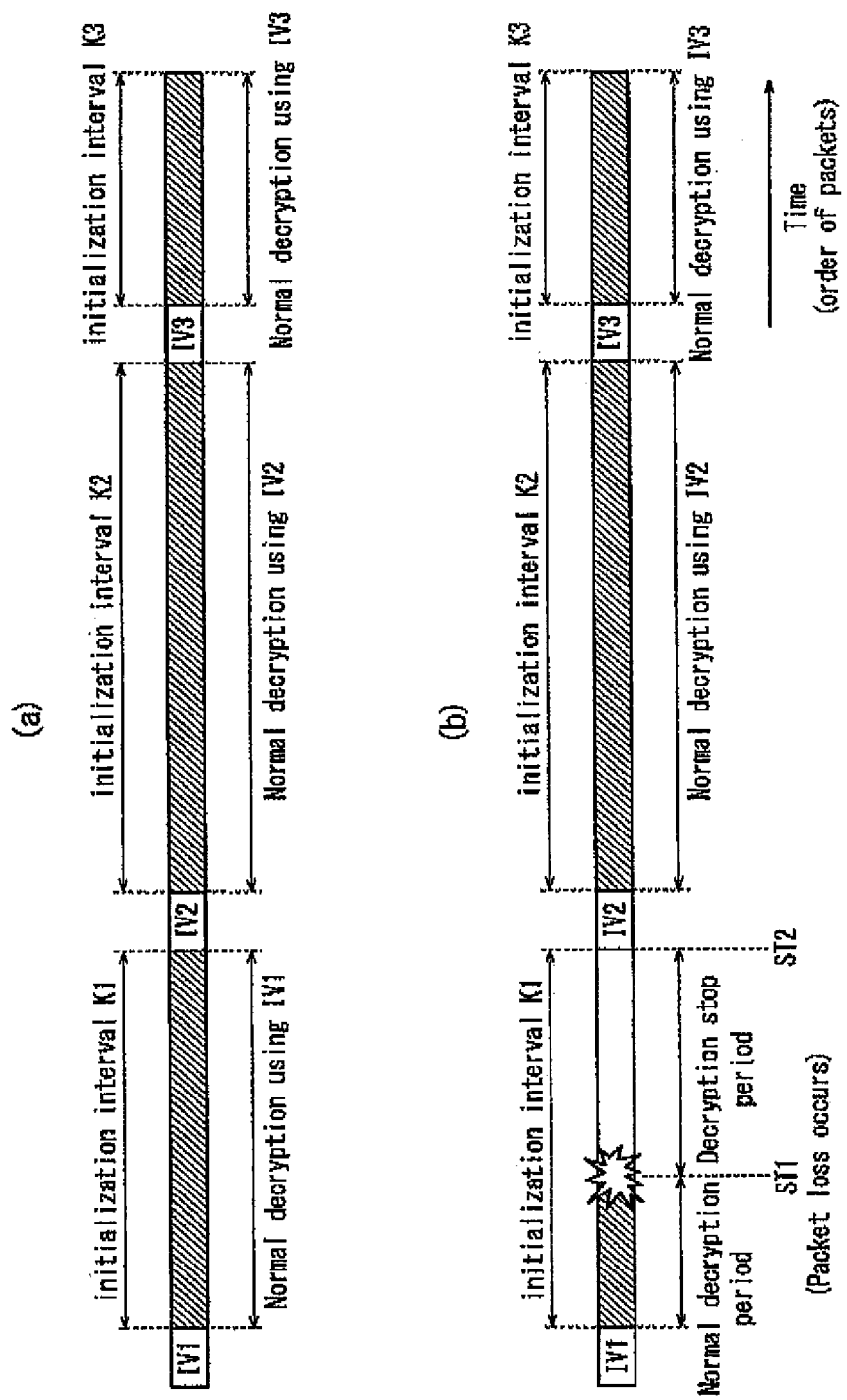
FIG. 9 is a timing chart illustrating a process for initialization packet loss in broadcasting data including stream-encrypted data according to the related art.

FIG. 7 is a timing chart illustrating a recovery process of the receiving apparatus (decoding apparatus) according to the present invention when packet losses are detected. As shown in FIG. 7, an initialization packet IP2 contains a current initialization vector IV2, a previous initialization vector IV1 and a total byte number IV1(num) (=an initialization interval K1) of data encrypted with the previous initialization vector IV1. Similarly, an initialization packet IP3 contains a current initialization vector IV3, a previous initialization vector IV2 and a total byte number IV2(num) (=an initialization interval K2) of data encrypted with the previous initialization vector IV2.

As shown in FIG. 7, packet loss PL8 occurs in the initialization interval K2. Since packet loss PL9 occurs again in a period from the point of time to a predetermined discard threshold C, the receiving apparatus sets a period between PL8 and PL9 as a discard period D, and do not perform decryption by discarding packets received at the discard period. In other words, in case that an error occurs again in a short period such as the predetermined discard threshold C, as the significance of data in the period is lowered, decryption is not performed. After the packet loss PL9, a decryption recovery period E is set and decryption is restarted using information contained in the initialization packet IP3. Therefore, according to the present invention, it is possible to stop decryption in a period in which even if data are decrypted, the probability that an original image or audio can is reproduced is low.

The present invention is widely applicable to apparatus using stream encryption in communication/broadcast in which retransmission is not basically performed such as general broadcast/multicast and the like. Specifically, the present invention can be employed in broadcasting apparatus for one segment broadcasting, cell phones or PDAs having broadcast reception function for one segment broadcasting, and the like. Since the cell phone moves continuously with a user, reception condition through a radio transmission path is likely to be poor, and therefore frequency of packet loss is increased. However, the present invention improves error resilience, so that it is possible to provide a user with good circumstance for watching broadcast/multicast.

While the invention has been described with reference to exemplary embodiments and drawings, it will be understood by those skilled in the art that many various modifications and extensions of the above-described technology may be implemented using the teaching of this invention. All such modifications and extensions are intended to be included within the true spirit and scope of the present invention. For example, functions included in each unit, step and the like can be rearranged not to be contradictory logically. And, a plurality of unit, steps and the like can be combined or divided. For example, in the embodiment, encryption packets and initialization packets are generated after encryption, but in MPEG2 or the like, only PES may be encrypted by being extracted from a converted packet into PES (Packetized Elementary Stream) format, PS format (pack packetization), or TS (Transport stream) format (TS packetization). In addition, in the embodiment, while packets of transport stream (TS) format is exemplarily chained, it is possible to apply the present invention into program stream (PS) packet if the total number of lost bits can be calculated by setting length of payload in each packet to fixed length. Moreover, while in the embodiments, an initialization vector which is different from the current initialization vector, and total byte number of data encrypted with the initialization vector are contained in one initialization packet, two or more other initialization vectors and total byte numbers can be contained.

The invention claimed is:

1. A method for making a content data encrypted with a stream encryption method and transmitted by broadcast/multicast by a transmission apparatus comprising a stream encryption module, an initialization vector generating unit and a transmission unit, wherein the content data are configured by the transmission unit to comprise:

at least, an initialization packet generated by the initialization vector generating unit containing an initialization vector used for initializing the stream encryption module when following stream content data are encrypted, wherein the initialization vector is changed at every initialization intervals defined by the stream encryption module; and an encryption packet containing stream-encrypted data generated by encrypting the following stream content data by the stream encryption module with the initialization vector, wherein the initialization packet further contains another initialization vector used for initializing the stream encryption module when another stream content data different from the following stream content data are encrypted.

2. The method for making the content data according to claim 1, wherein when a number of the encryption packets encrypted at each initialization interval varies, the initialization packet further contains a total byte number of the another stream content data encrypted with the another initialization vector contained in the initialization packet.

3. The method for making the content data according to claim 1, wherein the another initialization vector is a plurality of initialization vectors.

4. A transmitting apparatus comprising:
an initialization vector generating unit for generating an initialization vector for encrypting stream data with a stream encryption method, wherein the initialization vector is changed at every initialization intervals defined by a stream encryption module;

an initialization packet generating unit for generating an initialization packet containing an initialization vector used when stream data following the initialization packet are encrypted, and another initialization vector used when another stream data different from the stream data following the initialization packet are encrypted;

an encryption unit for initializing the stream encryption module by using the initialization vector generated by the initialization vector generating unit, and performing stream encryption on stream data following the initialization vector by using the initialized stream encryption module;

an encryption packet generating unit for generating an encryption packet containing stream-encrypted data encrypted by the encryption unit; and a transmission unit for transmitting the initialization packet and the encryption packet by broadcast/multicast.

5. The transmitting apparatus according to claim 4, wherein when a number of the encryption packets encrypted at each initialization interval varies, the initialization packet further contains a total byte number of the another stream data encrypted with the another encryption vector contained in the initialization packet.

6. The transmitting apparatus according to claim 4, wherein the another initialization vector is a plurality of initialization vectors.

7. A receiving apparatus comprising:
a reception unit for receiving an initialization packet containing an initialization vector for encrypting stream data following the initialization packet and another initialization vector for encrypting another stream data different from the stream data following the initialization packet, and an encryption packet containing stream-encrypted data encrypted with the initialization vector;

a decryption unit for initializing a stream encryption module using the initialization vector contained in the initialization packet and decrypting stream-encrypted data contained in the encryption packet;

a detection unit for detecting a reception error of a packet received by the reception unit; and a control unit for controlling the decryption unit, when a reception error of a packet is detected by the detection unit, so as to decrypt stream-encrypted data contained in an encryption packet following the packet in the reception error by using the another initialization vector contained in another initialization packet that is different from an initialization packet supposed to be used for decryption of the packet in the reception error.

8. The receiving apparatus according to claim 7, wherein when a number of the encryption packets encrypted at each initialization interval varies, the initialization packet further contains a total byte number of the another stream data encrypted with the another initialization vector contained in the initialization packet, and the control unit controls the decryption unit, when a reception error of a packet is detected by the detection unit, so as to decrypt stream-encrypted data contained in an encryption packet following the packet in the reception error by using the another initialization vector and the total byte number which are contained in the another initialization packet.

9. A decoding method comprising:
receiving step for receiving an initialization packet containing an initialization vector for encrypting stream data following the initialization packet and another initialization vector for encrypting another stream data different from the stream data following the initialization packet, and an encryption packet containing stream-encrypted data encrypted with the initialization vector, with a reception unit;

decrypting step for initializing stream encryption module using the initialization vector contained in the initialization packet, and decrypting stream-encrypted data contained in the encryption packet with the stream encryption module;

detecting step for detecting a reception error of a packet received at the receiving step; and controlling step for controlling the decrypting step, when a reception error of a packet is detected at the detecting step, so as to decrypt stream-encrypted data contained in an encryption packet following the packet in the reception error by using the another initialization vector contained in another initialization packet that is different from an initialization packet supposed to be used for decryption of the packet in the reception error.

* * * * *